US008018129B2

(12) United States Patent
Nakazawa

(10) Patent No.: US 8,018,129 B2

(45) Date of Patent: Sep. 13, 2011

(54) LIGHTING DEVICE FOR ENHANCED LIGHTING

(75) Inventor: Namio Nakazawa, Kizugawa (JP)

(73) Assignees: Monoco Technologies Corp., Tokyo (JP); Namio Nakazawa, Kyoto (JP); Hiromu Kobashi, Osaka (JP); Takao Watanabe, Hyogo (JP)

( * ) Notice: Subject to any disclaimer, the term of this patent is extended or adjusted under 35 U.S.C. 154(b) by 299 days.

(21) Appl. No.: 12/279,311

(22) PCT Filed: Feb. 20, 2007

(86) PCT No.: PCT/JP2007/053060

§ 371 (c)(1), (2), (4) Date: Oct. 13, 2008

(87) PCT Pub. No.: WO2007/097312

PCT Pub. Date: Aug. 30, 2007

(65) Prior Publication Data

US 2009/0102343 A1 Apr. 23, 2009

(30) Foreign Application Priority Data

Feb. 21, 2006 (JP) ................................ 2006-044511

(51) Int. Cl.
*H05B 37/02* (2006.01)
*B60Q 1/00* (2006.01)

(52) U.S. Cl. ................... 313/318.01; 313/624; 313/642; 313/356; 315/56; 315/291

(58) Field of Classification Search ........................ None
See application file for complete search history.

(56) References Cited

U.S. PATENT DOCUMENTS 5,746,615 A 5/1998 Ichikawa et al.

(Continued)

FOREIGN PATENT DOCUMENTS

CN 2411569 Y 12/2000

(Continued)

OTHER PUBLICATIONS

Office Action issued by Japanese Patent Office in parallel Japanese Patent Application No. 2006-044511; Report dated Jul. 27, 2010.

(Continued)

*Primary Examiner* — Anne Hines
*Assistant Examiner* — Tracie Green
(74) *Attorney, Agent, or Firm* — Miller, Matthias & Hull, LLP

(57) ABSTRACT

An entire length of a fluorescent lamp is made short to allow the fluorescent lamp to be downsized and the part other than the fluorescent lamp to be shortened so as to advantageously improve the design potentials and enhance the lighting effect. A fluorescent lamp to be fitted to a feeding side member, or a hook ceiling, having a pair of retaining holes and a pair of feeding side terminals arranged at corresponding positions, comprises a fluorescent lamp main body, an inverter-containing case arranged at a proximal end side of the fluorescent lamp main body and a pair of terminals arranged at the side of the case opposite to the fluorescent lamp main body. The pair of terminals have the tip ends bent so as to be retained by the feeding side member and establish electric connection to the feeding side terminals as they are respectively inserted into the pair of retaining holes of the feeding side member and displaced in the rotating direction around the center of the fluorescent lamp.

6 Claims, 10 Drawing Sheets

U.S. PATENT DOCUMENTS

2005/0275351 A1* 12/2005 Ge .................................. 315/56

FOREIGN PATENT DOCUMENTS

| | | | |
|---|---|---|---|
| DE | 196 25 673 | | 1/1997 |
| GB | 702677 | | 1/1954 |
| JP | 55-173882 | | 5/1979 |
| JP | 55-173882 | | 12/1980 |
| JP | 05-094807 | | 4/1993 |
| JP | 08-288286 | | 10/1996 |
| JP | 08-339780 | | 12/1996 |
| JP | 2000-223228 | A | 1/1999 |
| JP | 2000-100204 | | 4/2000 |
| JP | 2000-223228 | | 8/2000 |
| JP | 2004-172082 | | 6/2004 |
| JP | 2005-302702 | | 10/2005 |
| JP | 2006-12738 | | 1/2006 |
| JP | 2006-012738 | | 1/2006 |
| WO | WO 2004/114362 | | 12/2004 |
| WO | WO 2005/078763 | | 8/2005 |

OTHER PUBLICATIONS

Office Action issued on Feb. 9, 2009 corresponding to PCT/JP2007/053060.

European Search Report and Written Opinion from counterpart application No. EP 07 71 4563; Report dated Feb. 4, 2009.

Notification of First Office Action issued by Chinese Patent Office in related Chinese Patent Application No. 2010051100489630 dated May 14, 2010.

* cited by examiner

LIGHTING DEVICE FOR ENHANCED LIGHTING

CROSS-REFERENCE TO RELATED APPLICATION

This application is a U.S. National Phase of International Patent Application No. PCT/JP2007/053060, filed on Feb. 20, 2007, which claims priority under the Paris Convention to Japanese Patent Application No. JP 2006-044511, filed on Feb. 21, 2006.

FIELD OF THE DISCLOSURE

The present invention relates to a fluorescent lamp having a lamp main body and a case containing an inverter and a lighting apparatus including such a fluorescent lamp.

BACKGROUND OF THE DISCLOSURE

Fluorescent lamps ignited by means of an electric circuit that includes an inverter are known. As for the structure of fluorescent lamps of this type, the fluorescent lamp has a fluorescent lamp main body, a case (cover section) containing an electric circuit that includes an inverter arranged at the proximal end side (upper end side) of the lamp main body, an E-base connected to the case at the side opposite to the lamp main body (i.e. the top end) and projecting outward (upward) from the case and a lamp cover (light control body) covering the fluorescent lamp main body as shown in Patent Document 1, for instance. Then, the base is inserted and screwed into a socket typically fitted to the ceiling of a room.

Patent Document 1: Jpn. Pat. Appln. Laid-Open Publication No. 10-134614

In the known fluorescent lamp as shown in the above Patent Document 1, the case of a required size that contains an inverter is connected to the proximal end side of the lamp main body and an E base of a predetermined length further projects from an end section of the case so that the entire length of the fluorescent lamp is long. Particularly, the part other than the lamp main body that includes the case and the base has a considerable length and hence is disadvantageous in terms of shortening and downsizing the entire fluorescent lamp and also from the viewpoint of design and layout.

Additionally, when such a fluorescent lamp is fitted to the ceiling or a wall of a room for use, an area of the proximal end side of the fluorescent lamp including the case and the base becomes a dead angle area where no light reaches. When the part including the case and the base is long, the dead angle area becomes large so much. Therefore, known fluorescent lamps have a room for improvement.

SUMMARY OF THE DISCLOSURE

In view of the above-identified circumstances, the present invention provides a fluorescent lamp whose entire length is made short to allow the fluorescent lamp to be downsized and the part other than the fluorescent lamp to be shortened and that is effective to reduce the dead angle area and also a lighting apparatus.

In the first aspect of the present invention, there is provided a fluorescent lamp to be fitted to a feeding side member, including a hook ceiling, having a pair of retaining holes and a pair of feeding side terminals arranged at corresponding positions to the pair of feeding side terminals characterized in that it comprises: a fluorescent lamp main body; an inverter-containing case arranged at a proximal end side of the fluorescent lamp main body; and a pair of terminals arranged at a side of the case opposite to the fluorescent lamp main body; and that the pair of terminals have the tip ends bent so as to be retained by the feeding side member and establish electric connection to the feeding side terminals as they are respectively inserted into the pair of retaining holes of the feeding side member and displaced in a rotating direction around the center of the fluorescent lamp.

With this arrangement, only relatively small terminals to be retained by the hook ceiling are arranged at the end section of the inverter-containing case that is arranged at the proximal end side of the fluorescent lamp main body. Therefore, if compared with known fluorescent lamps where an E base projects further from an end section of an inverter-containing case, the part of the fluorescent lamp other than the fluorescent lamp main body is shortened and the fluorescent lamp can be downsized while the lighting effect is enhanced.

In the second aspect of the present invention, there is provided a fluorescent lamp to be fitted to a feeding side member having a fitting aperture of a predetermined contour at an end surface section and feeding side terminals arranged in the inside of the feeding side member, characterized in that it comprises: a fluorescent lamp main body; an inverter-containing case arranged at a proximal end side of the fluorescent lamp main body; and a terminal section arranged at a side of the case opposite to the fluorescent lamp main body;

and that the terminal section includes an insertion/retention section having a contour corresponding to that of the fitting aperture and linked to the case by way of a link section and terminals arranged near the insertion/retention section and is adapted to be retained by the feeding side member and establish electric connection to the feeding side terminals as the insertion/retention section is aligned with and inserted into the fitting aperture and subsequently displaced.

With this arrangement, only a relatively small terminal section that can be retained to the fitting aperture of the feeding side member is arranged at an end section of the inverter-containing case arranged at the proximal end side of the fluorescent lamp main body. Therefore, if compared with known fluorescent lamps, the part of the fluorescent lamp other than the fluorescent lamp main body is shortened and the fluorescent lamp can be downsized while the lighting effect is enhanced.

In the third aspect of the present invention, there is provided a fluorescent lamp to be fitted to a feeding side member of an E base socket having a cylindrical base engaging section, characterized in that it comprises: a fluorescent lamp main body; and an inverter-containing case arranged at a proximal end side of the fluorescent lamp main body; and that an E base is arranged at an outer peripheral section of the case and the E base is linked and electrically connected to the feeding side member as the E base is engaged with the feeding side member.

With this arrangement, the E base is arranged at the outer peripheral surface of the inverter-containing case and therefore the base does not remarkably project from an end section of the case. Therefore, with this arrangement, if compared with known fluorescent lamps, the part of the fluorescent lamp other than the fluorescent lamp main body is shortened and the fluorescent lamp can be downsized while the lighting effect is enhanced.

Preferably, the lamp main body is formed to show a spiral profile and an end section of a lamp main body side of the case projects so as to be narrowed toward the fluorescent lamp main body side, while the projecting section is surrounded by the lamp main body.

With this arrangement, the projecting section of the case intrudes into inside of the lamp main body so that the part thereof located outside the lamp main body is shortened and the fluorescent lamp can be downsized while the lighting effect is enhanced.

In other aspect of the present invention, there is provided a fluorescent lamp, characterized in that it comprises: a fluorescent lamp main body; an inverter-containing case arranged at a proximal end side of the fluorescent lamp main body; and a terminal section arranged at a side of the case opposite to the fluorescent lamp main body; and that the lamp main body is formed to show a spiral profile and an end section of a lamp main body side of the case projects so as to be narrowed toward the fluorescent lamp main body side, while the projecting section is surrounded by the lamp main body.

With this arrangement, again, the fluorescent lamp can be downsized while the lighting effect is enhanced.

Preferably, the peripheral surface of the narrowed projecting section operates as a reflecting surface for reflecting light irradiated from the lamp main body.

With this arrangement, light irradiated from the lamp main body and reflected by the reflecting surface reaches near the proximal end side of the fluorescent lamp so that the dead angle area where no light reaches can be sufficiently reduced. Furthermore, light is reflected outward by the reflecting surface located in the inside of the lamp main body to further raise the intensity of light irradiated from the lamp main body.

An apparatus may comprise a fluorescent lamp as defined above, and a lamp cover for covering the lamp main body of the fluorescent lamp, and a lamp cover fitting section may be arranged at a peripheral surface of the inverter-containing case of the fluorescent lamp to retain an end of the lamp cover. Additionally, an apparatus may comprise a fluorescent lamp as defined above, a socket to be connected to the terminal section of the fluorescent lamp and a lamp cover for covering the lamp main body of the fluorescent lamp, and a lamp cover fitting section may be arranged at a peripheral surface of the socket to retain an end of the lamp cover. With any of those arrangements, the lamp cover can be fitted to the fluorescent lamp with ease.

ADVANTAGES OF THE INVENTION

Thus, the part of a fluorescent lamp according to the present invention other than the fluorescent lamp main body can be downsized thus the design and layout potentials thereof are enhanced. At the same time, the dead angle area where no light reaches can be reduced to enhance the lighting effect.

EXPLANATION OF REFERENCE SYMBOLS

Figure 1:
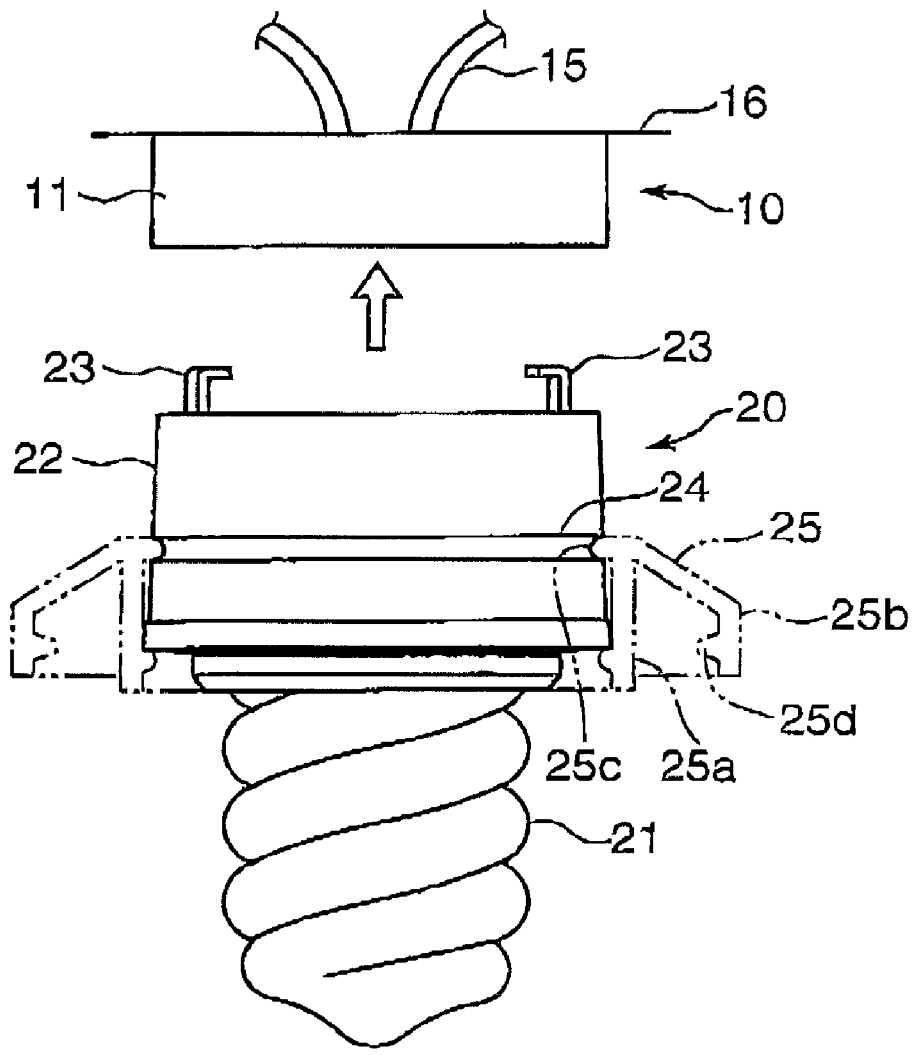
FIG. 1 is a front view of a fluorescent lamp according to a first embodiment of the present invention and a feeding side member to which it is fitted.

10, 110, 110A, 210, 310, 410: feeding side member
20, 120, 220, 320, 420: fluorescent lamp
21, 121, 221, 321, 421: fluorescent lamp main body
22, 122, 222, 322, 4322: case
23, 123, 223: terminal section

DETAILED DESCRIPTION

Now, embodiments of the present invention will be described by referring to the drawings.

Figure 2:
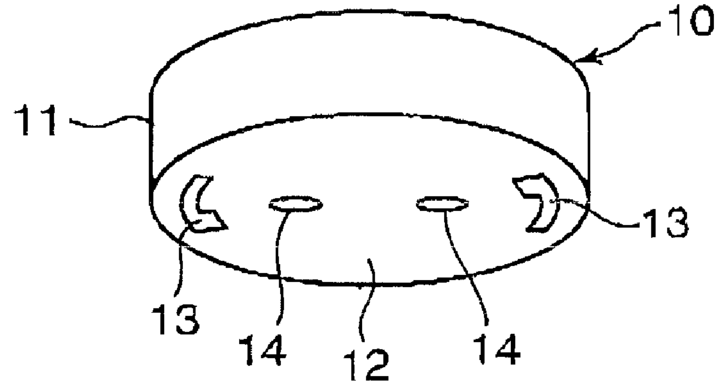
FIG. 2 is a perspective view of the feeding side member for the first embodiment as viewed from the lower surface side.
Figure 3:
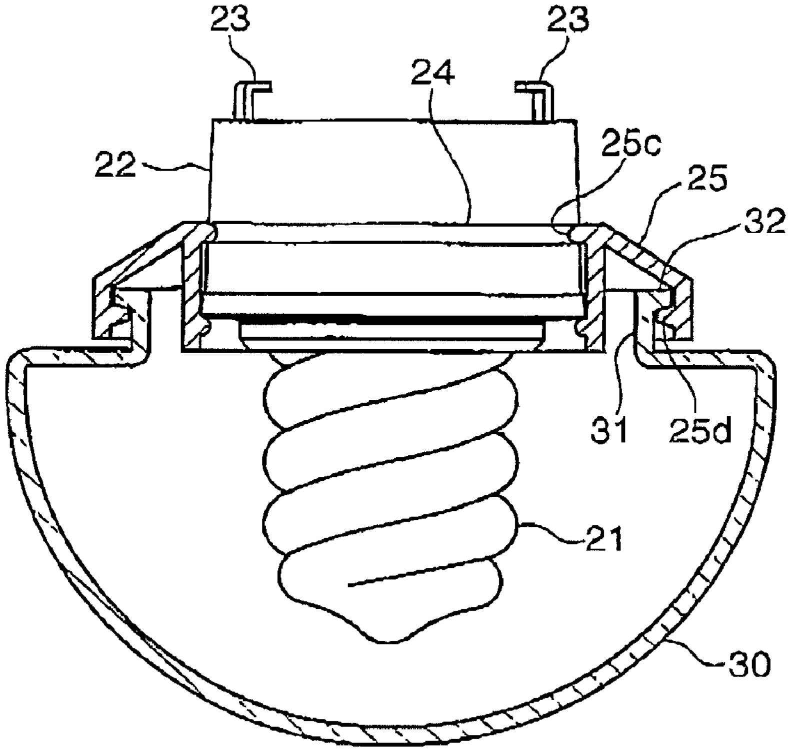
FIG. 3 is a cross-sectional view of the first embodiment of fluorescent lamp with a lamp cover fitted thereto.

FIGS. 1 through 3 illustrate the first embodiment. FIG. 1 is a front view of a feeding side member to which the fluorescent lamp of the first embodiment is fitted. FIG. 2 is a perspective view of the feeding side member as viewed from the lower surface side. FIG. 3 is a cross-sectional view of the above-described fluorescent lamp with a lamp cover fitted thereto.

As shown in these drawings, the fluorescent lamp 20 of the first embodiment is adapted to be fitted to a feeding side member 10 which is a hook ceiling.

As shown in FIG. 1 and FIG. 2, the hook ceiling, of the feeding side member 10, has a low profile cylindrical ceiling body 11 whose lower end section is closed by an end surface section 12 having a pair of retaining holes 13, 13. The pair of retaining holes 13, 13 have a substantially arc-shaped profile including a partially broad section and are arranged symmetrically relative to the center of the lower surface section 12. A pair of feeding side terminals (not shown) that are electrically connected to feeding lines 15 are arranged in the inside of the ceiling body 11 at positions corresponding to the retaining holes 13, 13. The feeding side member 10 is adapted to be fitted to a ceiling surface 16 of a room typically by means of screws or the like. Numeral 14 denotes a screw receiving small hole and a plurality of such holes are arranged appropriately on the lower surface section of the hook ceiling 10.

The fluorescent lamp 20 includes a fluorescent lamp main body 21, an inverter-containing case 22 arranged at the proximal end side of the fluorescent lamp main body 21 and a pair of terminals 23, 23 arranged at the side of the case 22 opposite to the fluorescent lamp main body 21. In the illustrated instance, the fluorescent lamp 20 is fitted to the hook ceiling 10 in a state where the pair of terminals 23, 23 are positioned at the top end and the fluorescent lamp main body 21 projects downward from the case 22.

The fluorescent lamp main body 21 is a so-called spiral lamp having a spiral profile in the illustrated instance.

The case 22 contains an electric circuit for ignition (not shown) including an inverter and formed to show a required size. The pair of terminals 23, 23 are formed to be hook-shaped with a bent tip end and arranged at positions corresponding to the retaining holes 13, 13 so as to project upward from the case 22 in a state where they are electrically connected to an electric circuit in the case 22.

Additionally, the case 22 is provided on the peripheral surface thereof with a lamp cover fitting section so that a lamp cover 30 for covering the fluorescent lamp main body 21 can be fitted. In this embodiment, an annular fitting groove 24 is formed on the peripheral surface of the case 22 and the lamp cover 30 can be fitted to the fitting groove 24 by way of an auxiliary member 25, the lamp cover fitting section being formed by the fitting groove 24 and the auxiliary member 25.

The auxiliary member 25 integrally has a cylindrically-shaped inner peripheral wall 25*a* and an outer peripheral wall 25*b* extending outwardly from the top end thereof to appear like a sunshade. An annular ridge 25*c* that can be retained to the fitting groove 24 is formed on the inner peripheral surface of the top end part of the auxiliary member 25. An annular projecting section 25*d* for retaining the cover is formed on the inner surface of a lower part of the outer peripheral wall 25*b* of the auxiliary member 25.

The auxiliary member 25 is entirely and integrally formed by using rubber or synthetic resin having resiliency as a whole.

Additionally, the lamp cover 30 is formed by using synthetic resin or glass to show a profile appropriate for covering the fluorescent lamp main body 21 and providing a decoration effect. A low profile cylindrical engaging section 31 having a predetermined size so as to allow itself to be engaged with the inside of the outer peripheral wall 25*b* of the auxiliary member 25 is formed at the top end of the lamp cover as an extension and an annular edge section 32 is arranged at and projects outwardly from the top end of the engaging section 31. When the engaging section 31 is engaged with the auxiliary member 25, the edge section 32 rides over the projecting section 25*d* and gets to the upper side thereof so as to be retained by the projecting section 25*d*.

When the fluorescent lamp 20 is attached to the feeding side member 10 (hook ceiling), firstly the pair of terminals 23, 23 projecting upward from the case 22 are inserted into the pair of retaining holes 13, 13 of the feeding side member 10 by way of the broad sections thereof and subsequently the fluorescent lamp 20 is turned around its center. Then, as a result, the terminals 23, 23 are displaced in the rotating direction of the fluorescent lamp 20 and retained to the feeding side member 10, while they are electrically connected to the feeding side terminals in the ceiling body 11.

Additionally, when the lamp cover 30 is attached to the fluorescent lamp 20, firstly the auxiliary member 25 is put to the outside of the case 22 and the ridge 25*c* is retained to the fitting groove 24. Then, as a result, the auxiliary member 25 is fitted to the fluorescent lamp 20. Subsequently, as shown in FIG. 3, the auxiliary member 25 is engaged at the top end thereof with the engaging section 31 and the edge section 32 is retained to the projecting section 7, so that the lamp cover 30 is fitted to the fluorescent lamp 20.

In this way, the lamp cover 30 can be attached to the fluorescent lamp 20 with ease and detached therefrom also with ease.

The fluorescent lamp 20 of this embodiment and a lighting apparatus including it provide following advantages and effects.

Since the fluorescent lamp 20 is provided at the top end of the case 22 only with terminals 23, 23 that can be retained to the feeding side member 10 (hook ceiling), it can be formed compact if compared with known fluorescent lamps of this type.

More specifically, a fluorescent lamp of this type indispensably requires a fluorescent lamp main body and an inverter-containing case. While a known fluorescent lamp shown in the above-described Patent Document 1 includes an E base having relatively large dimensions in addition to a fluorescent lamp main body and a case, the fluorescent lamp of this embodiment does not have any E base and only has small terminals 23, 23 arranged at an end of the case so that the part of the fluorescent lamp 20 other than the fluorescent lamp main body 21 can be shortened and downsized to a large extent. As a result, the entire fluorescent lamp 20 can be downsized, although the lamp main body 21 has necessary dimensions.

Additionally, as the part other than the fluorescent lamp main body 21 is shortened, the distance from the wall surface (ceiling surface) where the feeding side member 10 is secured to the fluorescent lamp main body 21 is reduced in a state where the fluorescent lamp 20 is fitted to the feeding side member 10 to by turn reduce the dead angle area around the proximal side of the fluorescent lamp 20 where light does not reach from the fluorescent lamp main body 21 to enhance the lighting effect.

Furthermore, the lamp cover 30 can be attached to and detached from the fluorescent lamp main body 21 with ease. Still additionally, several different lamp covers 30 showing different appearances may be provided in advance and a desired lamp cover 30 may be selectively fitted to the fluorescent lamp main body 21 to enhance its decoration effect and improve the variety.

Figure 4:
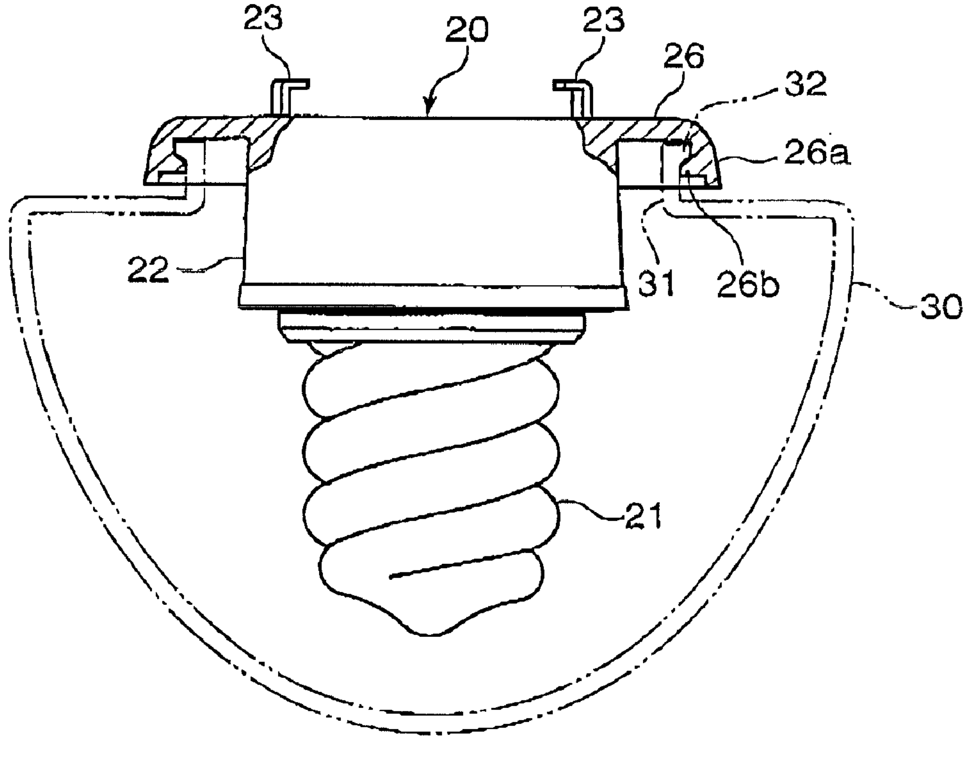
FIG. 4 is a partial cross-sectional front view of a fluorescent lamp obtained by modifying the first embodiment of fluorescent lamp.

While the auxiliary member 25 is retained to the fitting groove 24 formed on the case 22 for the structure for fitting the lamp cover 30 in the above-described first embodiment, a lamp cover fitting section 26 may be integrally formed with the case 22 of a fluorescent lamp 20 as shown in FIG. 4. The lamp cover fitting section 26 projects around the case 22 like a sword guard and a low profile cylindrical edge frame section 26*a* is formed so as to extend from the outer periphery of the lamp cover fitting section 26. An annular projecting section 26*b* is formed along the inner periphery of the lower end of the edge frame section 26*a* to retain the cover.

Another modified embodiment may be so arranged that a lamp cover 30 is fitted to a feeding side member 10 (hook ceiling) to which a fluorescent lamp 20 is fitted.

Figure 5:
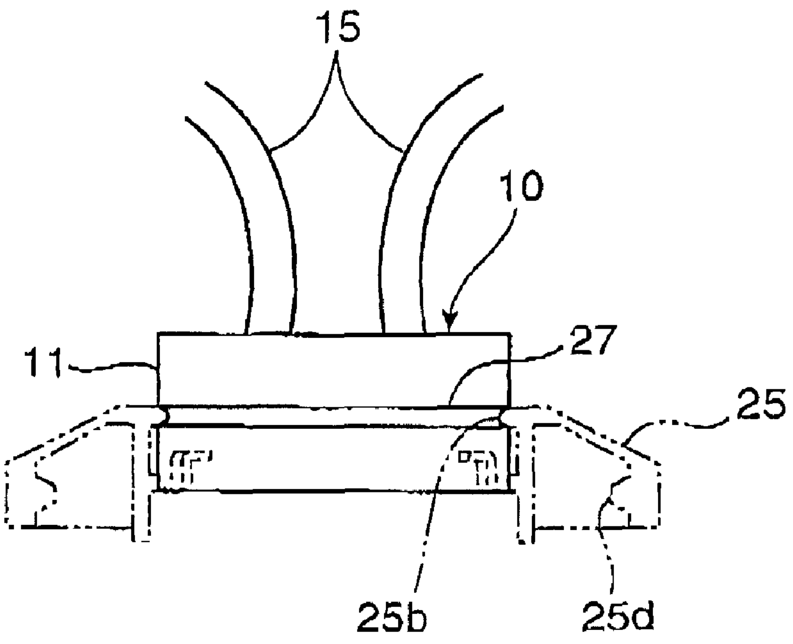
FIG. 5 is a front view of a feeding side member obtained by modifying the feeding side member for the first embodiment.

For instance, as shown in FIG. 5, such a modified embodiment may be so arranged that a fitting groove 27 which is an annular recessed groove is formed on the peripheral surface of the ceiling body 11 of the feeding side member 10 and the lamp cover 30 is fitted to the fitting groove 27 by way of an auxiliary member 25. The auxiliary member 25 has a structure similar to the auxiliary member 25 as shown in FIG. 1 and FIG. 3.

Figure 6:
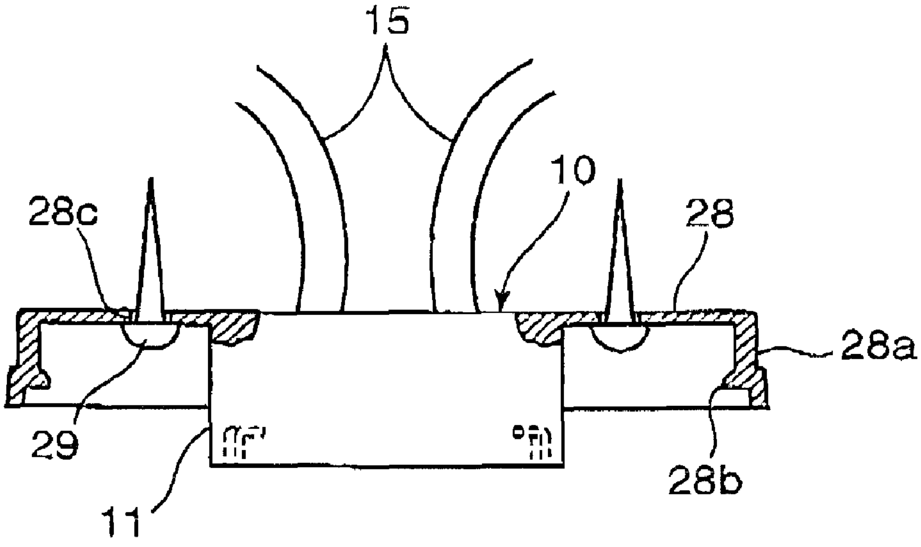
FIG. 6 is a partial cross-sectional front view of another feeding side member obtained by modifying the feeding side member for the first embodiment.

Alternatively, as shown in FIG. 6, a lamp cover fitting section 28 may be integrally arranged on the ceiling body 11 of a hook ceiling 10. The lamp cover fitting section 28 has a structure substantially same as the lamp cover fitting section 26 shown in FIG. 4 and has an edge frame section 28*a* along the outer periphery, which edge frame section 28*a* has an annular projecting section 28*b* for retaining a lamp cover that is formed on the inner periphery of the lower end thereof. In addition to such a structure, the lamp cover fitting section 28 has screw receiving small holes 28*c* at a plurality of positions in the plane part thereof. Then, the ceiling body 11 is fitted to the ceiling surface 16 by means of the screws 29 penetrating the small holes 28*c*.

When a lamp cover can be fitted to a feeding side member 10 in a manner as described above, the weight of the lamp cover is not borne by the fluorescent lamp 20 so that the weight burden by the fluorescent lamp is reduced.

Furthermore, the auxiliary member 25 shown in FIG. 5 may be extended upward and the top end may be formed so as to be held in tight contact with a ceiling fitting surface, which may be a ceiling surface or the like, directly or by way of a packing or, alternatively, the top surface of a lamp cover fitting section 28 as shown in FIG. 6 may be formed so as to be held in tight contact with a ceiling fitting surface, which may be a ceiling surface or the like, directly or by way of a packing in order to improve the waterproof property with respect to the ceiling body 11.

Figure 7:
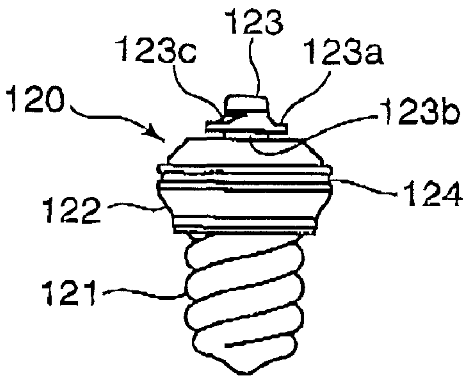
FIG. 7 is a front view of a second embodiment of fluorescent lamp.
Figure 8:
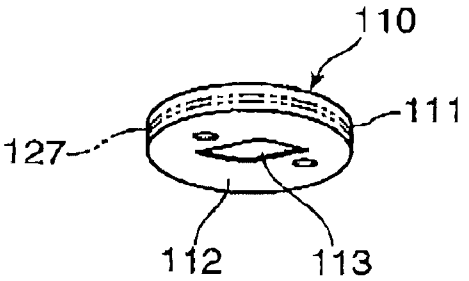
FIG. 8 is a perspective view of the feeding side member for the second embodiment as viewed from the lower surface side.

FIGS. 7 and 8 illustrate the second embodiment. FIG. 7 is a front view of a fluorescent lamp 120 of the second embodiment. FIG. 8 is a perspective view of a feeding side member 110 as viewed from the lower surface side.

As shown in the drawings, the feeding side member 110 and the fluorescent lamp 120 of this embodiment are of the wiring duct ceiling type.

More specifically, as shown in FIG. 8, the feeding side member 110 has a single fitting hole 113 (fitting aperture) of a predetermined contour at the end surface section 112 closing the lower end of the body 111 formed to show a low profile cylindrical shape or the like and contains a feeding side terminal (not shown). The body 111 is adapted to be typically fitted to a ceiling surface.

On the other hand, as shown in FIG. 7, the fluorescent lamp 120 includes a fluorescent lamp main body 121, an inverter-containing case 122 arrange at the proximal end side of the fluorescent lamp main body 121 and a terminal section 123 arranged at the side (upper end) of the case 122 opposite to the fluorescent lamp main body 121.

The terminal section 123 has a shape corresponding to the fitting hole 113 and includes an insertion/retention section 123*a* linked to the case 122 by way of a link section 123*b* and a terminal 123*c* arranged near the insertion/retaining section 123*a*.

When the fluorescent lamp 120 is attached to the feeding side member 110, the insertion/retention section 123*a* is aligned with and inserted into the fitting hole 113 and then the fluorescent lamp 120 is driven to rotate so that the terminal section 123 is displaced in the rotating direction, the insertion/retention section 123*a* is retained to the feeding side member 110 and the terminal 123*c* and the feeding side terminal are electrically connected.

As a structure for fitting a lamp cover, the case 122 is provided with a fitting groove 124 that is an annular recessed groove as in the case of the fluorescent lamp of the first embodiment shown in FIGS. 1 and 3 and the lamp cover 30 (see FIG. 3) is fitted to the fitting groove 124 by way of an auxiliary member 25 (see FIG. 3).

In this embodiment again, the terminal section 123 projecting from the case 122 is smaller than the E base of the known fluorescent lamp shown in the Patent Document 1 so that the part of the fluorescent lamp 120 other than the fluorescent lamp main body 121 is shortened and downsized to provide advantages similar to those of the first embodiment.

Figure 9:
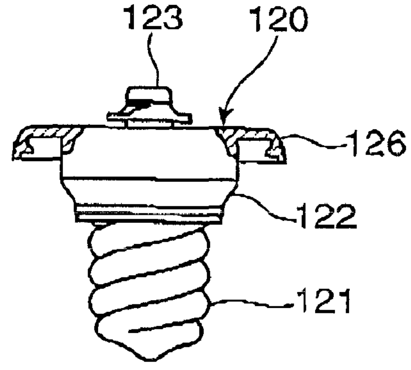
FIG. 9 is a partial cross-sectional front view of a fluorescent lamp obtained by modifying the second embodiment of fluorescent lamp.

The second embodiment may be modified such that a lamp cover fitting section 126 is integrally formed with the case 122 of the fluorescent lamp 120 as shown in FIG. 9.

Figure 10:
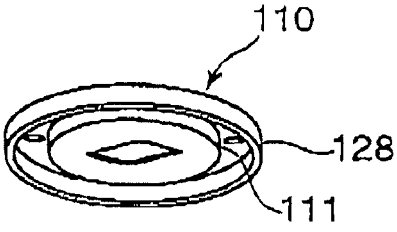
FIG. 10 is a perspective view of a feeding side member obtained by modifying the feeding side member for the second embodiment as viewed from the lower surface side.

Additionally, the lamp cover may be so adapted as to be fitted to the feeding side member 110. For instance, a fitting groove 127 may be formed on the body 111 of the feeding side member 110 so that the lamp cover may be fitted thereto by way of an auxiliary member as shown by doubly dotted chain lines in FIG. 8 or a lamp cover fitting section 128 may be formed integrally with the body 111 as shown in FIG. 10.

Figure 11:
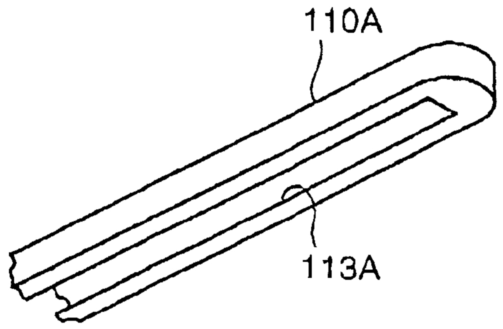
FIG. 11 is a perspective view of another feeding side member obtained by modifying the feeding side member for the second embodiment as viewed from the lower surface side.

While the feeding side member 100 structurally has a fitting hole 113 of a predetermined contour at the end surface section 112 of the low profile cylindrical body 111 in the instance illustrated in FIG. 8, a feeding side member 110A may be realized by an oblong wiring duct rail having a fitting aperture 113A that extends in the longitudinal direction with a constant width as shown in FIG. 11.

In such a case, as the terminal section 123 of the fluorescent lamp 120 is inserted into the fitting aperture 113A at a desired position of the feeding side member (wiring duct rail) 110A and driven to rotate, the insertion/retention section 123*a* is retained to the feeding side member (wiring duct rail) 110A and the terminal section 123*c* is connected to the feeding side terminal arranged at the wiring duct rail. In this way, a fluorescent lamp 120 may be fitted directly to the wiring duct rail.

Figure 12:
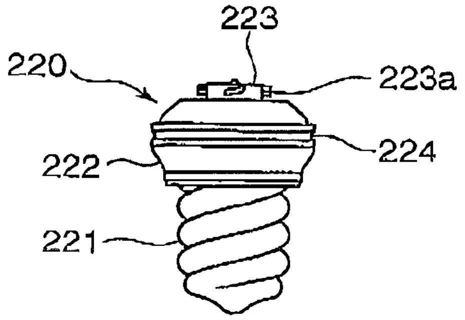
FIG. 12 is a front view of the third embodiment of fluorescent lamp.
Figure 13:
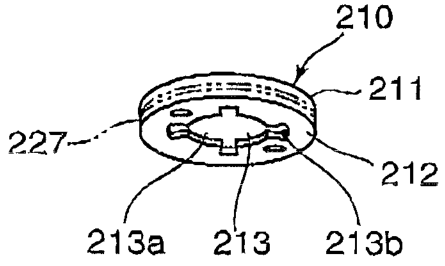
FIG. 13 is a perspective view of the feeding side member for the third embodiment as viewed from the lower surface side.

FIGS. 12 and 13 illustrate the third embodiment. FIG. 12 is a front view of a fluorescent lamp 220 of the third embodiment. FIG. 13 is a perspective view of a feeding side member 210 as viewed from the lower surface side.

As shown in these drawings, the feeding side member 210 and the fluorescent lamp 220 of the third embodiment are of the swan base type.

As shown in FIG. 13, the feeding side member 210 has a single fitting hole 213 at the end surface section 212 of the body 211. The fitting hole 213 shows a contour including a substantially circular central hole section 213*a* and radial hole sections 213*b* extending from the periphery thereof.

On the other hand, as shown in FIG. 12, the fluorescent lamp 220 includes a fluorescent lamp main body 221, an inverter-containing case 222 arranged at the proximal end side of the fluorescent lamp main body 221 and a terminal section 223 arranged at the side (upper end) of the case 222 opposite to the fluorescent lamp main body 221. The terminal section 223 includes an insertion/retention section 223*a* having a shape corresponding to the fitting hole 213 and terminals.

When the fluorescent lamp 220 is attached to the feeding side member 210, the insertion/retention section 123*a* is aligned with and inserted into the fitting hole 213 and then the fluorescent lamp 220 is driven to rotate so that the fluorescent lamp 220 is retained to and the terminals thereof are electrically connected to the feeding side member 210.

This embodiment provides advantages similar to those of the first and second embodiments.

Figure 14:
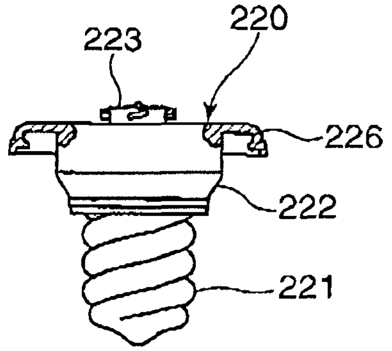
FIG. 14 is a partial cross-sectional front view of a fluorescent lamp obtained by modifying the third embodiment of fluorescent lamp.
Figure 15:
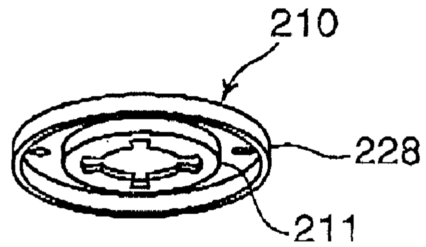
FIG. 15 is a perspective view of a feeding side member obtained by modifying the feeding side member for the third embodiment as viewed from the lower surface side.

In this embodiment again, as a structure for fitting a lamp cover, the case 222 is provided with a fitting groove 224 for fitting the lamp cover by way of an auxiliary member (see FIG. 12). Alternatively, a lamp cover fitting section 226 may be formed integrally with the case 222 as shown in FIG. 14 or a fitting groove 227 may be formed in the body 211 of the feeding side member 210 (doubly dotted chain lines in FIG. 13). Still alternatively, a lamp cover fitting section 228 may be formed integrally with the body 211 as shown in FIG. 15.

Figure 16:
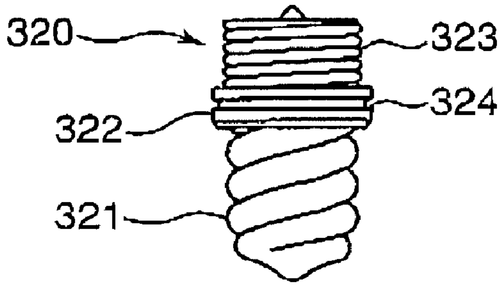
FIG. 16 is a front view of a fourth embodiment of fluorescent lamp.
Figure 17:
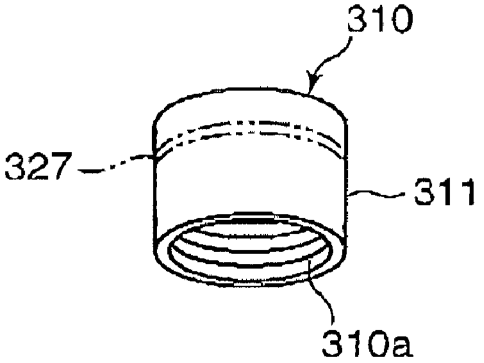
FIG. 17 is a perspective view of the feeding side member for the fourth embodiment as viewed from the lower surface side.

FIGS. 16 and 17 illustrate the fourth embodiment. FIG. 16 is a front view of a fluorescent lamp 320 of the fourth embodiment. FIG. 17 is a perspective view of a feeding side member 310 as viewed from the lower surface side.

As shown in the drawings, the feeding side member 310 and the fluorescent lamp 320 of the fourth embodiment are of an improved E base type.

More specifically, as shown in FIG. 17, the feeding side member 310 is a cylindrical E base socket having an internal thread 310*a* formed on the inner peripheral surface thereof.

On the other hand, as shown in FIG. 16, the fluorescent lamp 320 includes a fluorescent lamp main body 321, an inverter-containing case 322 arranged at the proximal end side of the fluorescent lamp main body 321 and an E base 323 arranged on the outer periphery of the case 322.

The E base 323 has an external thread that corresponds to the internal thread 310*a* of the feeding side member 310 and is made of an electro-conductive metal material and rigidly secured to the outer peripheral surface of the case 322 within a predetermined range. In the instance shown in FIG. 16, the E base 323 is arranged within a range extending from the top end to near the bottom end of the case 322.

When the fluorescent lamp 320 is attached to the feeding side member 310, the case 322 is inserted into the feeding side member 301 (socket) and the E base 323 on the outer periphery of the case 322 is engaged with the internal thread 310*a* of the feeding side member 310 so that the fluorescent lamp 320 is retained and electrically connected to the feeding side member 310.

With this embodiment, the E base 323 is arranged on the outer peripheral section of the case 322 and integrated with the case 322 of the fluorescent lamp 320 so that, if compared with a known product where a base project above a case as shown in the above-described Patent Document 1, the length of the part including the case and the E base is shortened.

Therefore, this embodiment provides advantages similar to those of the above-described first through third embodiments.

Figure 18:
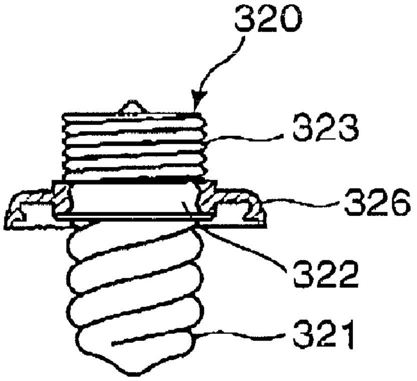
FIG. 18 is a partial cross-sectional front view of a fluorescent lamp obtained by modifying the fourth embodiment of fluorescent lamp.
Figure 19:
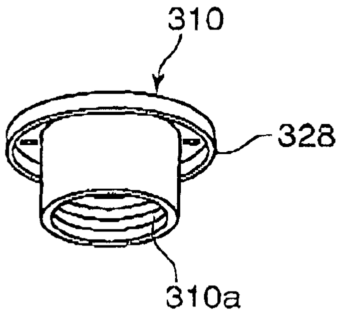
FIG. 19 is a perspective view of a feeding side member obtained by modifying the feeding side member for the fourth embodiment as viewed from the lower surface side.

In this embodiment again, as a structure for fitting a lamp cover, the case 222 is provided with a fitting groove 324 for fitting the lamp cover by way of an auxiliary member (see FIG. 16) or a lamp cover fitting section 326 is formed integrally with the case 322 as shown in FIG. 18. Alternatively, a fitting grove 327 may be formed on the body 311 of the feeding side member 310 (doubly dotted chain lines in FIG. 17) or a lamp cover fitting section 328 may be formed integrally with the feeding side member 310 as shown in FIG. 19.

Figure 20:
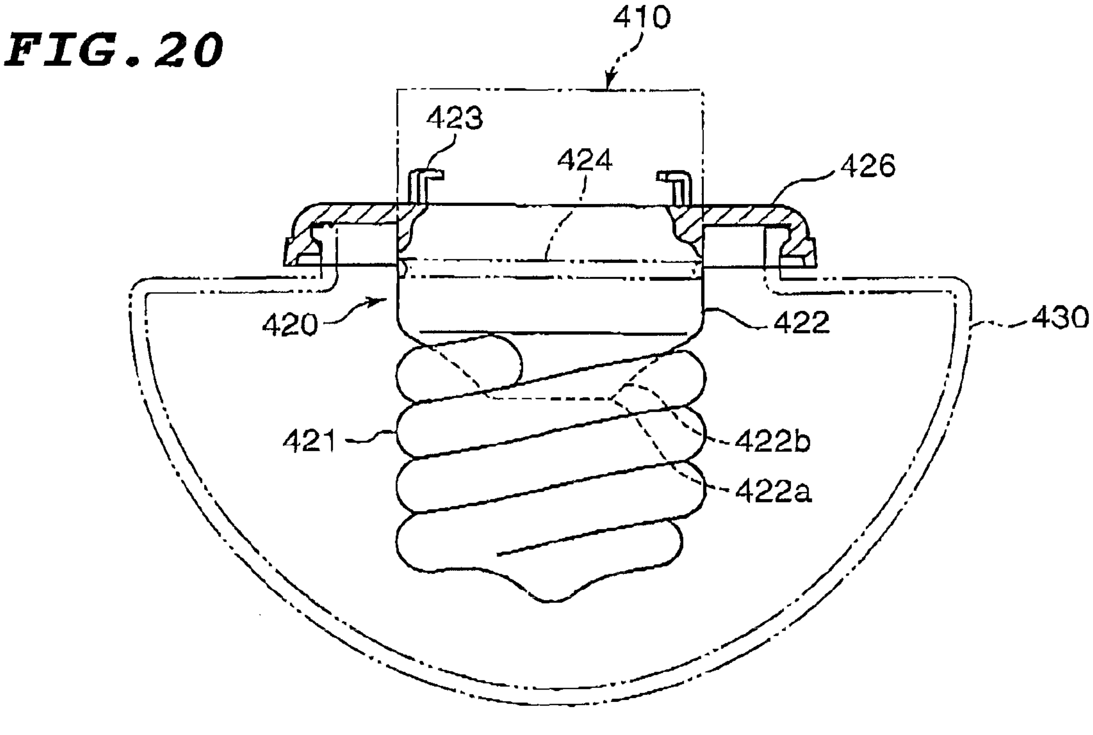
FIG. 20 is a partial cross-sectional front view of a fifth embodiment of fluorescent lamp.

FIG. 20 is a partial cross-sectional front view of the fluorescent lamp 420 of the fifth embodiment.

The fluorescent lamp 420 of the fifth embodiment includes a fluorescent lamp main body 421, an inverter-containing case 422 arranged at the proximal end side of the fluorescent lamp main body 421 and a terminal section 423 arranged at the side (upper end) of the case 422 opposite to the fluorescent lamp main body 421. The fluorescent lamp main body 421 has a spiral profile. A projecting section 422*a* having a profile substantially same as that of an inverted frustum of cone is arranged at the lower end section (the end section at the side of the fluorescent lamp main body) of the case 422. The peripheral surface of the projecting section 422*a* is curved so as to be narrowed toward the distal end and the proximal section of the fluorescent lamp main body 421 is connected to a position close to the proximal side of the curved peripheral surface 422*b*. Then, the spiral fluorescent lamp main body 421 extends downward from that position and a major part of the projecting section 422*a* is surrounded by the fluorescent lamp main body 421.

Additionally, the peripheral surface 422*b* of the projecting section 422*a* is so formed as to show a surface condition of a high reflectance so that it operates as reflecting surface for reflecting light irradiated from the fluorescent lamp main body 421.

With this structure, the required volume of the inverter-containing case 422 is secured and the projecting section 422*a* that is part of the case 422 intrudes into the inside of the lamp main body 421 so that the part of the case 422 that projects upward from the fluorescent lamp main body 421 is shortened and hence the fluorescent lamp 420 can be downsized.

Additionally, the distance from the wall surface (ceiling surface) where the feeding side member 410 is rigidly secured to the fluorescent lamp main body 421 is reduced in a state where the fluorescent lamp 420 is fitted to the feeding side member 410 so that the dead angle area where no light reaches from the fluorescent lamp main body 421 is reduced around the proximal side of the fluorescent lamp 420. Furthermore, light is reflected toward the ceiling side by the peripheral surface 422*b* of the projecting section 422*a* so that the dead angle area can be reduced to further enhance the lighting effect.

Figure 21:
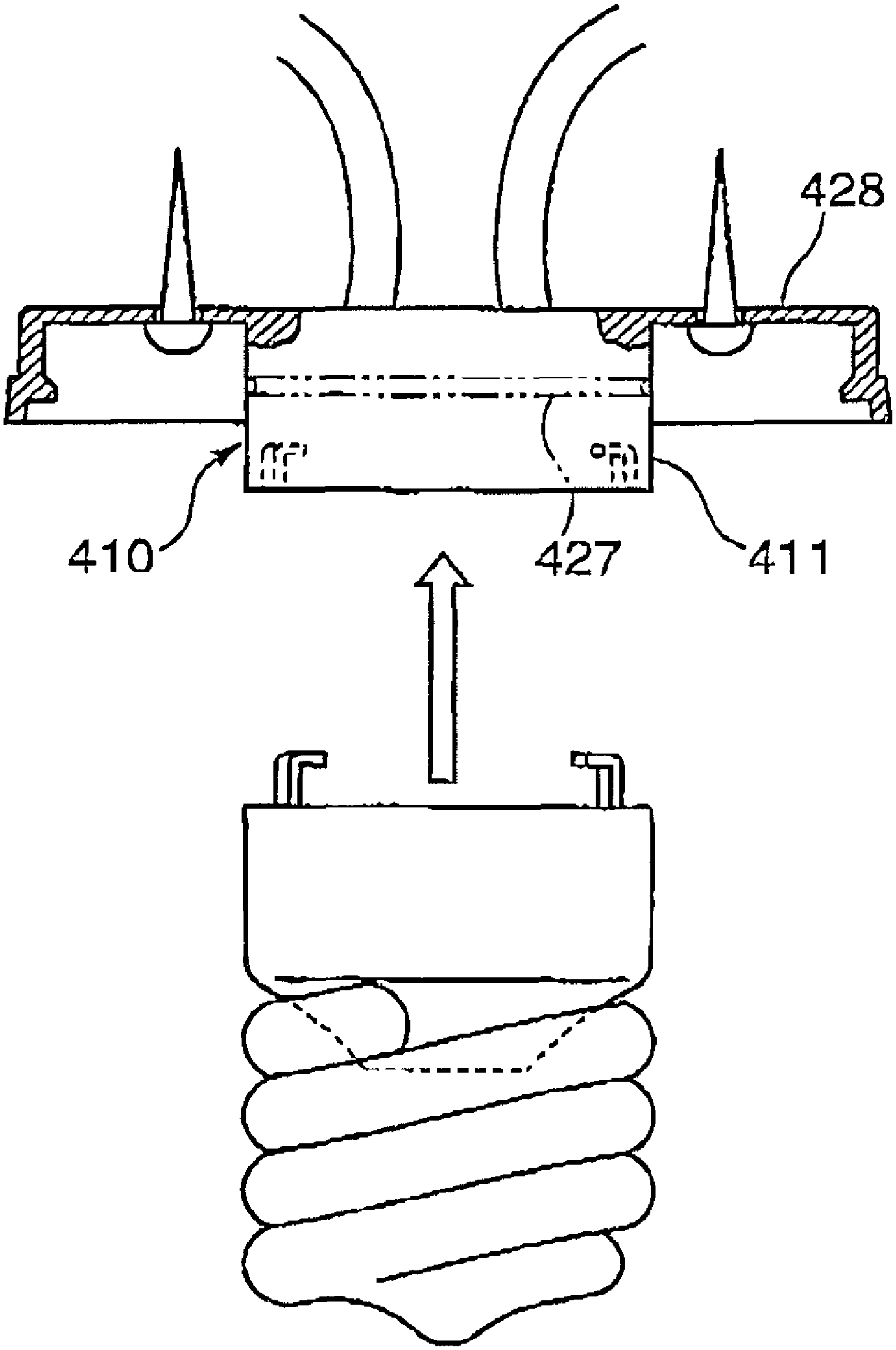
FIG. 21 is a partial cross-sectional front view of a fluorescent lamp obtained by modifying the fifth embodiment of fluorescent lamp.

While the lamp cover fitting section 426 is arranged integrally with the case 422 of the fluorescent lamp 420 in the instance shown in FIG. 20, the structure for fitting the lamp cover 430 may be modified or altered in various different ways as in the case of the other embodiments. For examples, a fitting groove 424 may be formed on the case 222 as indicated by doubly dotted chain lines in FIG. 20. Alternatively, as shown in FIG. 21, a lamp cover fitting section 428 (indicated by solid lines in FIG. 21) or a fitting groove 427 (indicated by doubly dotted chain lines in FIG. 21) may be formed on the body 411 of the feeding side member 410.

Figure 22:
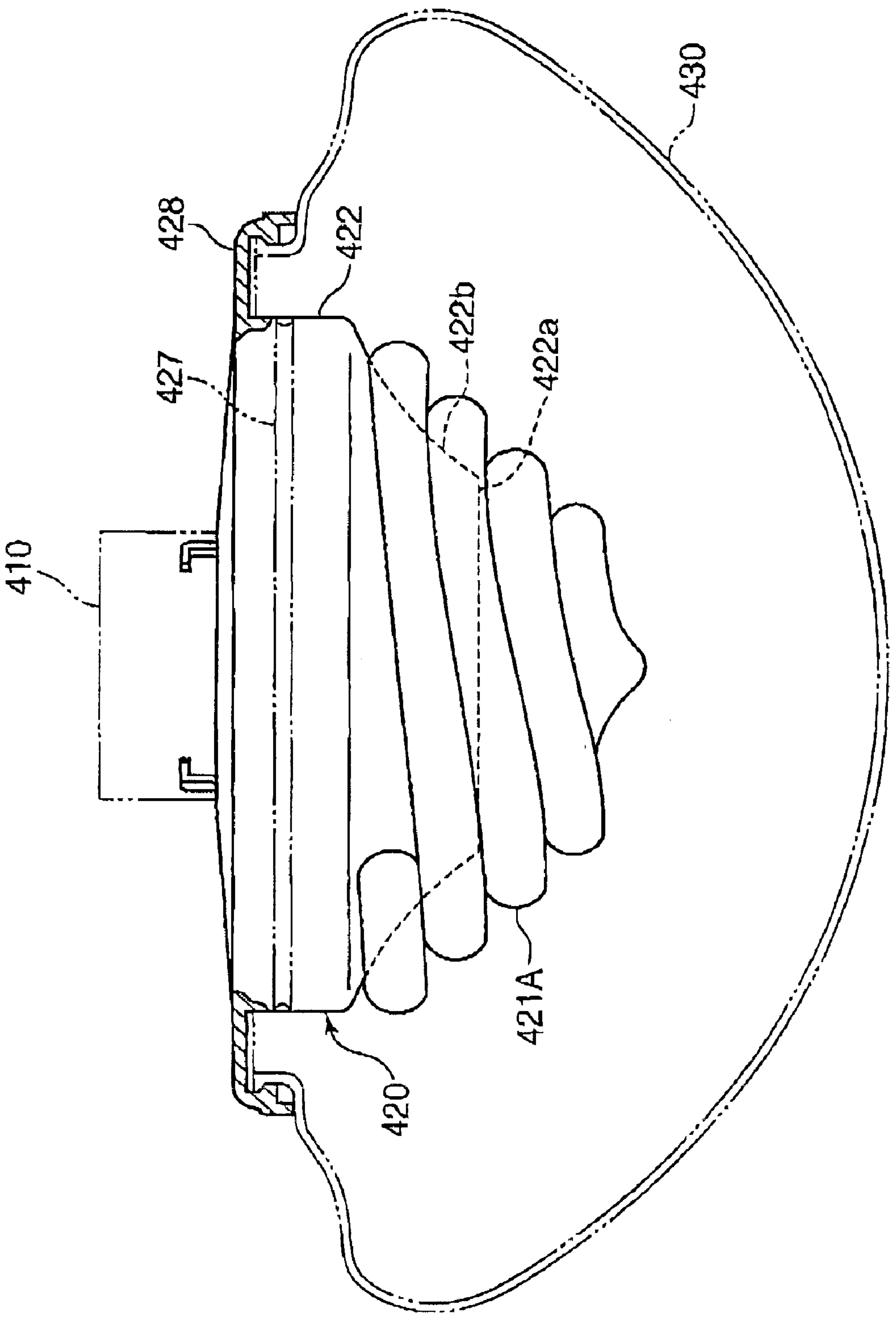
FIG. 22 is a partial cross-sectional front view of another fluorescent lamp obtained by modifying the fifth embodiment of fluorescent lamp.

While the fluorescent lamp main body 421 is formed to show a spiral profile with a substantially constant radius of curvature in the instance of FIG. 20, it may be replaced with a fluorescent lamp main body 421A whose radius of curvature is gradually reduced toward the tip end side as shown in FIG. 22.

Figure 23:
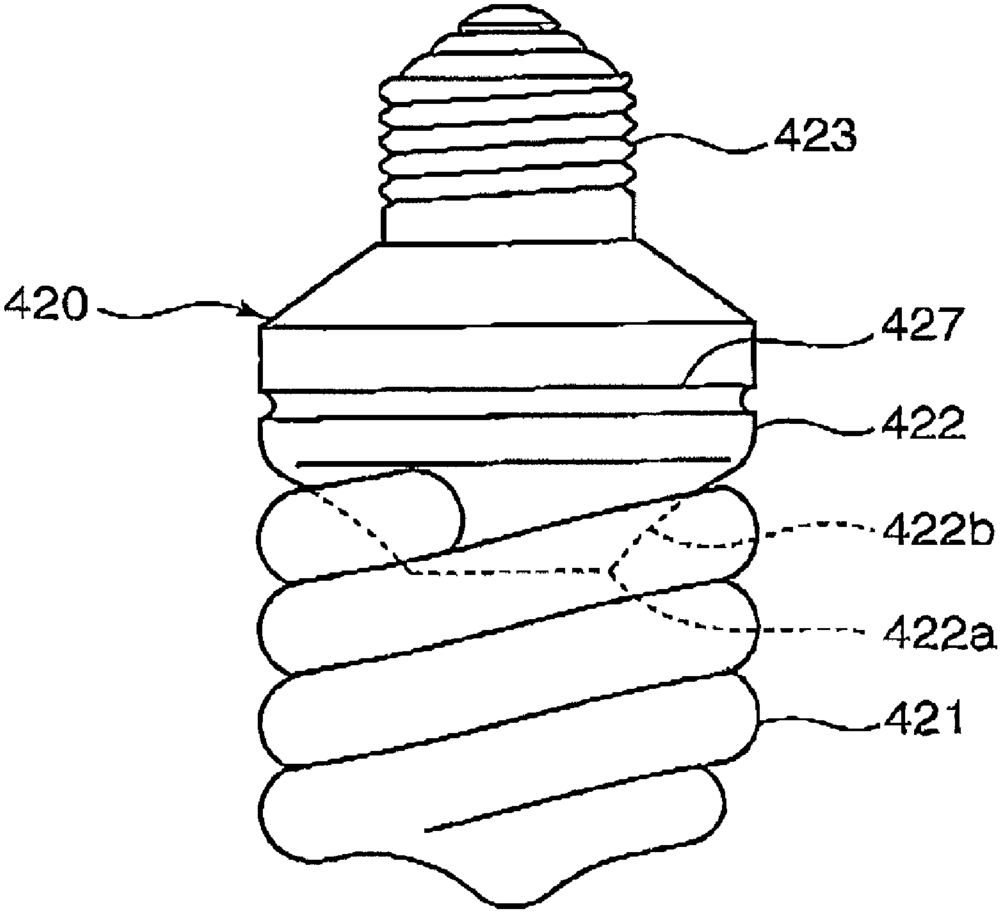
FIG. 23 is a partial cross-sectional front view of still another fluorescent lamp obtained by modifying the fifth embodiment of fluorescent lamp.

While the feeding side member 410 and the terminal section 423 of the fluorescent lamp 420 that is retained to it show a structure of the hook ceiling type in the instance shown in FIG. 20, they may be of some other structure (such as of the wiring duct ceiling type). Even if a structure where an E base 423 projects upward from the case 422 of the fluorescent lamp 420 as shown in FIG. 23 is employed, the advantages of downsizing the fluorescent lamp can be obtained when a projecting section 422*a* having a profile substantially same as that of an inverted frustum of cone is arranged at the lower end section.

The profiles of lamp cover are not limited to those shown in the drawings and they may be modified or altered in various different ways in consideration of decoration effect and other factors. The profiles of auxiliary member that can be employed when a lamp cover is fitted to a fluorescent lamp or a feeding side member by way of the auxiliary member as described above may also be modified or altered in various different ways. For example, an auxiliary member that is formed large so as to cover and hide a feeding side member may be employed.

While the feeding side member is directly and rigidly secured to a ceiling in each of the above-described embodiments, it may alternatively be fitted by way of a suspension member. Still alternatively, the feeding side member may be fitted to the wall surface of a vertical wall and a fluorescent lamp may be fitted to it in a horizontal state. The position and the way of fitting a feeding side member may be changed in various different ways.

The invention claimed is:

1. A fluorescent lamp to be fitted to a feeding side member, comprising:

a fluorescent lamp main body; and an inverter-containing case arranged at a proximal end side of the fluorescent lamp main body; wherein the fluorescent lamp main body is formed to show a spiral profile;

the inverter-containing case is provided with a terminal section to be fitted to the feeding side member, the terminal section adapted to be inserted into an opening of the feeding side member and displaced relative to the feeding side member so that the terminal section is retained on a peripheral around the opening; and an end section of a fluorescent lamp main body side of the inverter-containing case is formed as a projecting section projecting inside the fluorescent lamp main body and the projecting section of the inverter-containing case is surrounded by the fluorescent lamp main body showing a spiral profile in a manner that a volume for containing an inverter of the inverter-containing case is ensured.

2. The fluorescent lamp according to claim 1, wherein:

the feeding side member is formed as a hook ceiling having a pair of retaining holes and a pair of feeding side terminals arranged at positions corresponding to the pair of retaining holes; and the terminal section includes a pair of terminals arranged at a side of the case opposite to the fluorescent lamp main body and having tip ends bent so as to be retained by the feeding side member and establish electric connection to the feeding side terminals as they are respectively inserted into the pair of retaining holes of the feeding side member and displaced in the rotating direction around the center of the fluorescent lamp.

3. The fluorescent lamp according to claim 1, wherein:

the feeding side member has a fitting aperture having a predetermined contour at an end surface section thereof and feeding side terminals in the inside thereof; and the terminal section includes an insertion/retention section having a contour corresponding to the fitting aperture and arranged at a side of the case opposite to the fluorescent lamp main body and terminals arranged near the insertion/retention section so as to be retained by the feeding side member and establish electric connection to the feeding side terminals as the insertion/retention section is aligned with and inserted into the fitting aperture and displaced.

4. The fluorescent lamp according to claim 1, wherein:

the projecting section is narrowed toward a tip end thereof and a peripheral surface thereof operates as a reflecting surface for reflecting light irradiated from the lamp main body.

5. A lighting apparatus comprising:

a fluorescent lamp according to claim 1; and a lamp cover for covering the fluorescent lamp main body of the fluorescent lamp; wherein a lamp cover fitting section is arranged at a peripheral surface of the inverter-containing case of the fluorescent lamp to retain an end of the lamp cover.

6. A lighting apparatus comprising:

a fluorescent lamp according to claim 1;

a socket to be connected to the terminal section of the fluorescent lamp; and a lamp cover for covering the fluorescent lamp main body of the fluorescent lamp; wherein a lamp cover fitting section is arranged at a peripheral surface of the socket to retain an end of the lamp cover.

* * * * *